Figure 1:
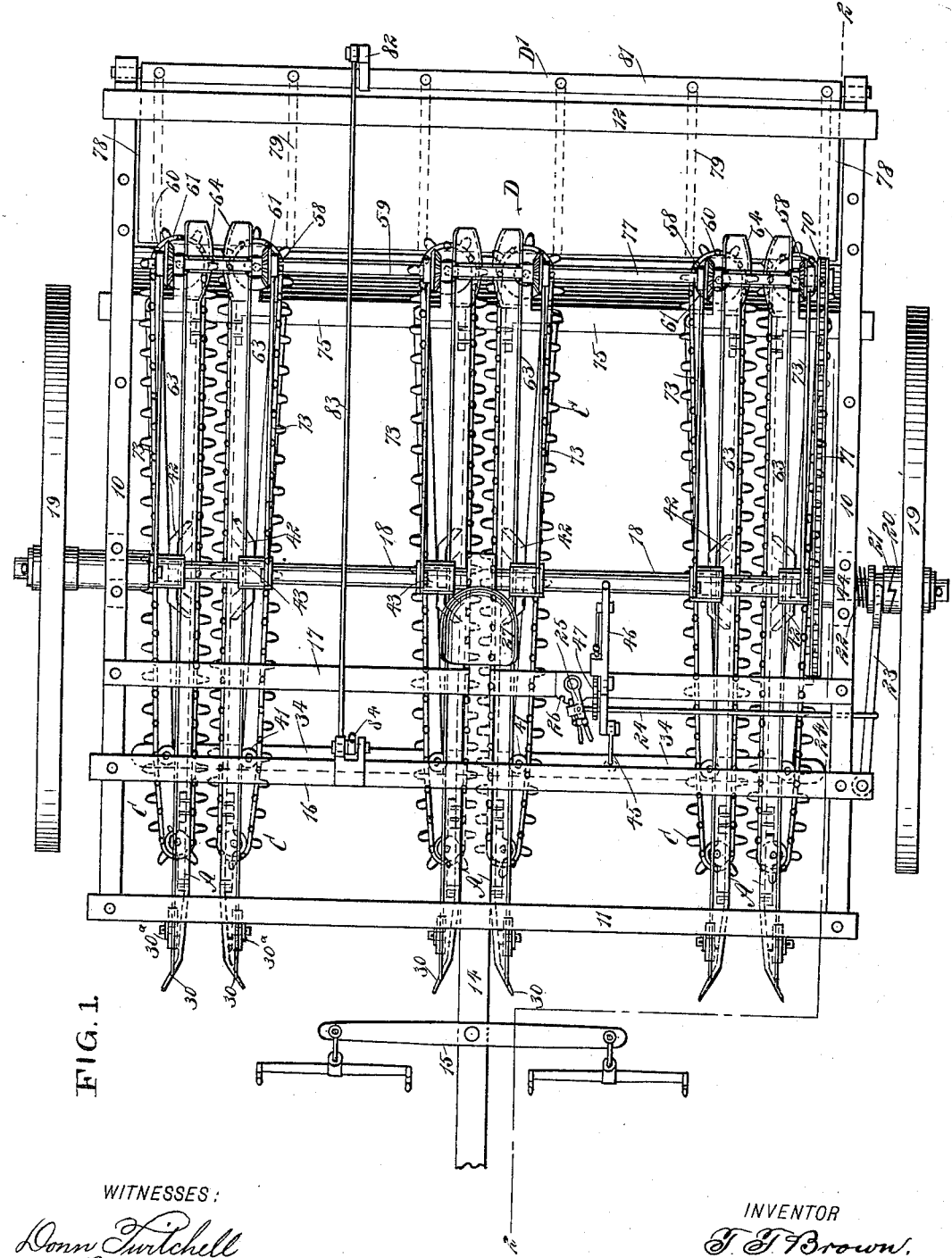

No. 634,873. Patented Oct. 17, 1899.
T. T. BROWN.
BEAN HARVESTER.
(Application filed May 23, 1898.)

(No Model.) 4 Sheets—Sheet 1.

WITNESSES:
Donn Twitchell
Fred Acker

INVENTOR
T. T. Brown.
BY
ATTORNEYS.

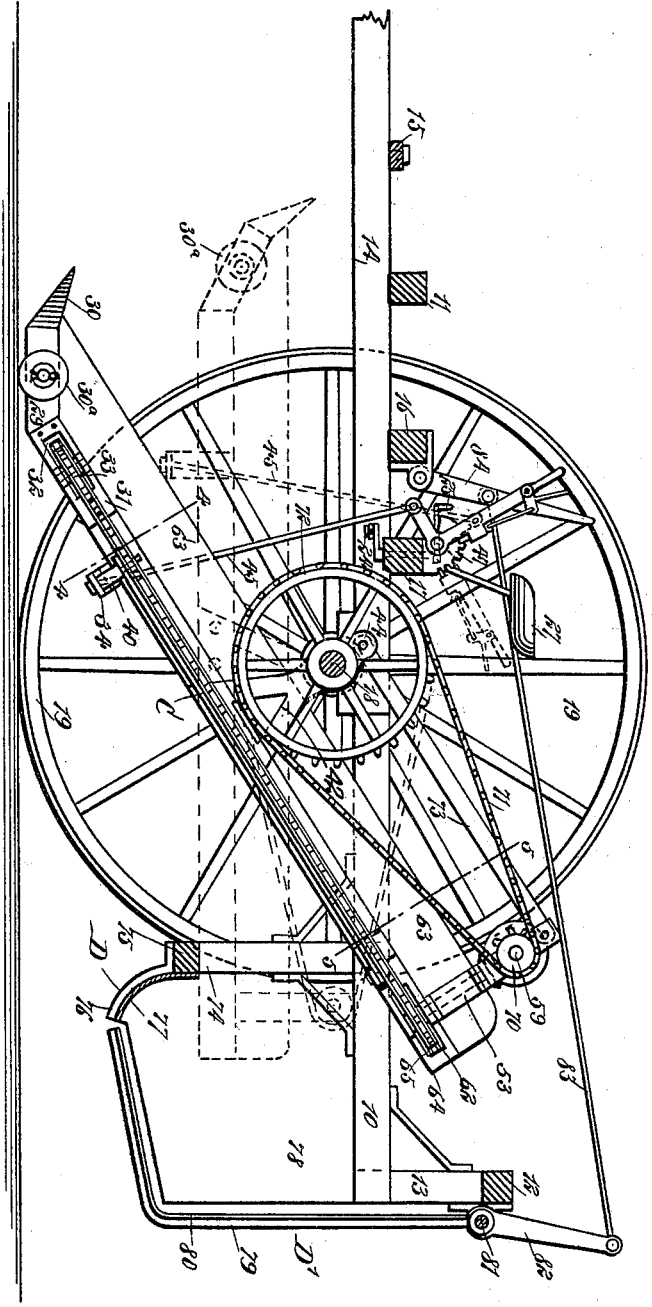

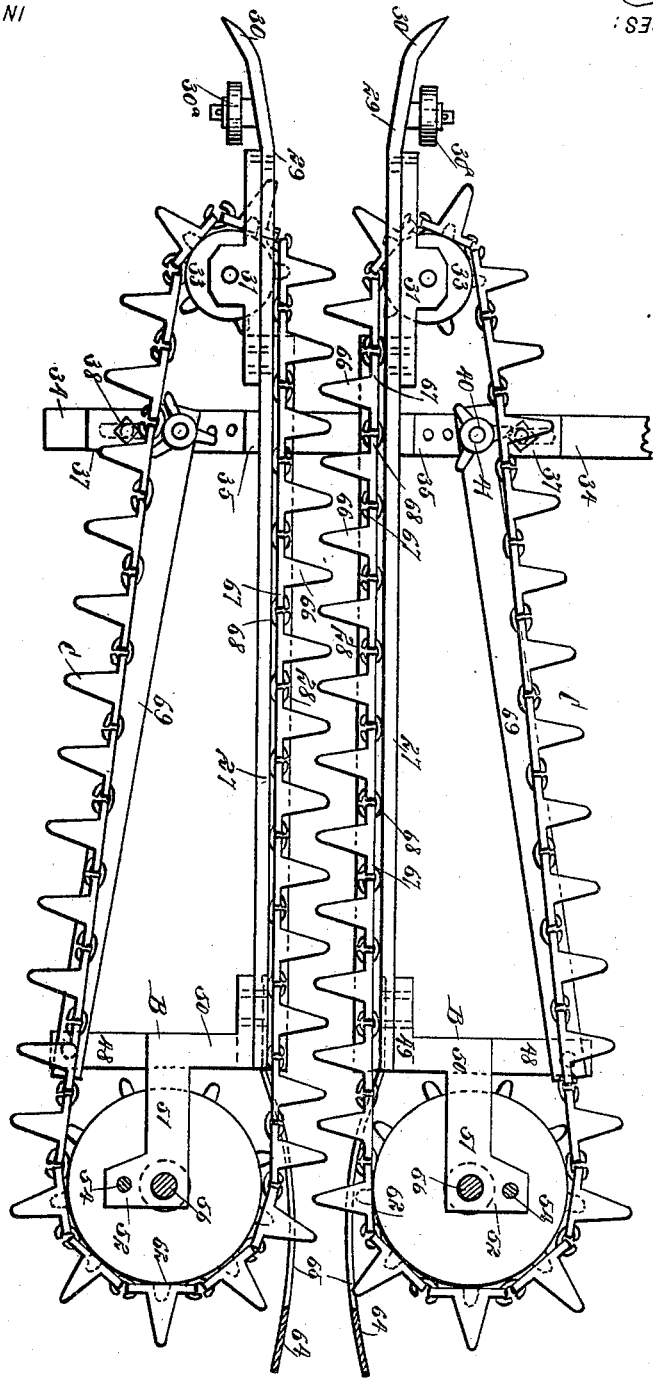

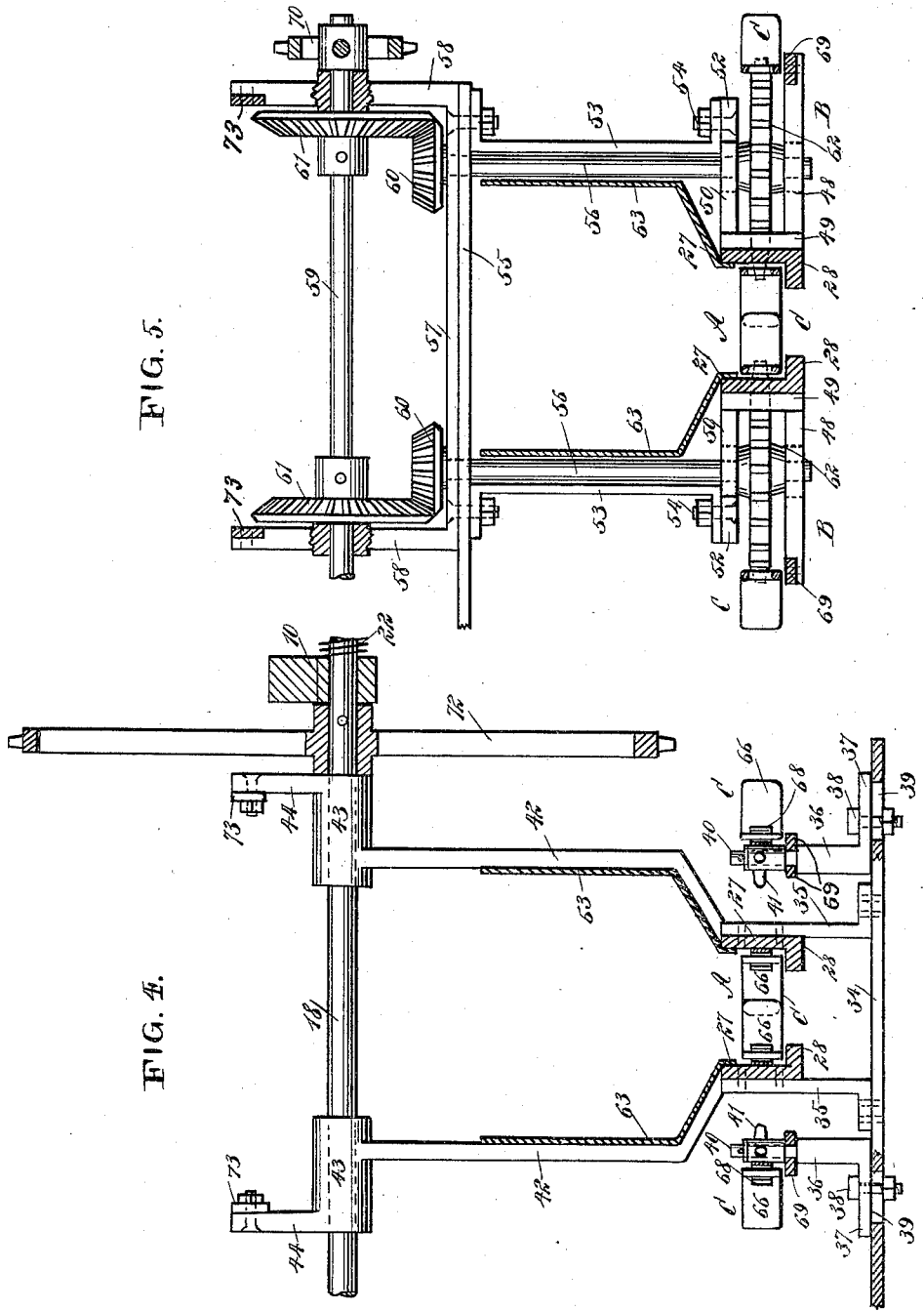

UNITED STATES PATENT OFFICE.

THOMAS T. BROWN, OF EUCLID, MINNESOTA, ASSIGNOR OF ELEVEN-TWENTIETHS TO H. C. MISNER & CO. AND EDGAR J. HASELTINE, OF SAME PLACE.

BEAN-HARVESTER.

SPECIFICATION forming part of Letters Patent No. 634,873, dated October 17, 1899.

Application filed May 23, 1898. Serial No. 681,493. (No model.)

*To all whom it may concern:*

Be it known that I, THOMAS T. BROWN, of Euclid, in the county of Polk and State of Minnesota, have invented a new and Improved Bean-Harvester, of which the following is a full, clear, and exact description.

This invention relates to that class of bean-harvesters in which the beans are gathered by chutes mounted on the harvester and having pairs of endless gathering-chains provided with spurs or other means for engaging and advancing the beans along the chutes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a longitudinal section taken practically on the line 2 2 of Fig. 1. Fig. 3 is an enlarged plan view of one of the gathering-chutes and the gathering-chains carried thereby, a portion of the mechanism carried by the chute being in horizontal section. Fig. 4 is a transverse section through one of the gathering-chutes and the wheel 72, the section being taken substantially on the line 4 4 of Fig. 2 and a line parallel thereto through the center of the wheel; and Fig. 5 is a transverse section through one of the gathering-chutes, the section being taken substantially on the line 5 5 of Fig. 2.

In the construction of the frame of the machine two side sills 10 are employed, connected by a front sill 11 and a rear sill 12, the rear sill 12 being raised above the side sills by uprights 13. A tongue 14 is attached to the front sill 11 and is preferably carried rearward to the axle, the said tongue being provided with the usual doubletree 15, and cross-bars 16 and 17 are carried from one side sill to the other, being in engagement with the top portion of the side sills, as is likewise the front sill, as shown in Fig. 2. The axle 18 is journaled in suitable bearings secured to the side sills of the frame, and said axle 18 is located nearer the front of the frame than the rear, as is best illustrated in Fig. 1. The supporting-wheels 19 of the machine are loosely mounted on the axle 18 outside of the frame, and one of the wheels, preferably the left-hand wheel, is provided with a clutch-surface 20 upon its hub, adapted to engage with a clutch 21, which clutch is held to turn with the axle 18 and slide thereon, the clutch being forced to a contact with the clutch-surface of the wheel by a spring 22. A shifting-lever 23 is in engagement with the clutch 21, and the said shifting-lever is fulcrumed, preferably, at the left-hand end of the front intermediate cross-bar 16, as is also shown in Fig. 1. A link 24 is attached to the shifting-lever 23 at a suitable point between its ends, and the link 24 is likewise attached to a lever 25, the said lever being shown as a horizontal one, and it is fulcrumed upon the cross beam or bar 17. A rack 26 is provided for the thumb-latch of the lever 25.

Three gathering-chutes are usually employed in connection with the frame; but a greater or a less number may be used, if desired. Each of the gathering-chutes is of the same construction, and all of said gathering-chutes are suspended from the axle 18, the chutes being placed parallel with each other and longitudinally of the frame. The construction of the gathering-chutes is best shown in Fig. 3. Each of the chutes consists of a body or main guide-bar 27. These bars are parallel and are placed a predetermined distance apart, and each of the guide-bars 27 is provided with a horizontal inwardly-extending flange 28 at its bottom, as shown best in Figs. 4 and 5. The flanges 28 extend from the rear ends of the guide-bars 27 to a point near their forward ends; but the forward ends of the guide-bars are so shaped as to provide a section 29 at an angle to the main portion of the bar, the said section 29, when the chute is in working position, being adapted to be parallel with the ground, as shown in Fig. 2, and a finger 30 is projected from each section 29, the fingers of the two guide-bars being carried upwardly and laterally in opposite directions, as shown in both Figs. 1 and 3.

Supporting-wheels 30ª are journaled upon the outer side faces of the end sections 29 of the said guide-bars, the wheels 30ª being adapted to travel on the ground when a chute is placed in an inclined or working position. Between the sections 29 of each guide-bar 27 and the outer end of the flanges for said bars a box 31 is secured upon the outer faces of the said guide-bars, and the guide-bars are provided with longitudinal openings 32 (shown in Fig. 2) opposite the central portions of the boxes 31. A sprocket-wheel 33 is journaled in each of the boxes 31, and as the wheel revolves the teeth are adapted to extend through the opening 32 into the space between the guide-bars.

All of the gathering-chutes are connected by a cross-bar 34. This cross-bar is not, however, attached to the frame of the machine, and it is located between the center of the chute and its forward end. The cross or connecting bar 34 is below the under surface of the chutes and is connected with the several chutes through the medium of uprights 35, secured to the outer faces of the guide-bars 27 of the chutes and to the upper face of the said connecting-bar, as is best illustrated in Fig. 4. Adjacent to each side of each chute a tension-post 36 is mounted upon the connecting-bar 34, as is also best shown in Fig. 4. Each tension-post is provided with a foot 37, and the foot of each tension-post is adjustably attached to the connecting-bar 34 by passing bolts 38 through the feet of the tension-posts and through slots 39, made longitudinally in the connecting-bar 34. The upper end of each tension-post is reduced to form a spindle 40, and upon each spindle a small spur or sprocket wheel 41 is mounted to revolve.

Hangers 42 are employed for pivotally supporting the several gathering-chutes from the axle 18. These hangers are bifurcated at their lower ends, as illustrated in Fig. 2, and at their bifurcated portions are attached to the outer side faces of the guide-bars 27 of the chutes at or near the centers of the said guide-bars. As illustrated in Fig. 4, these hangers are provided at their upper ends with rigidly-attached sleeves 43, and through the said sleeves the axle 18 is passed, and each sleeve 43 is provided, preferably at its outer end, with an upwardly-extending standard 44.

The chutes when not in use are adapted to be brought to the horizontal position shown in dotted lines in Fig. 2, and when the chutes are in use they are inclined, as shown in positive lines in the said Fig. 2, the supporting-wheels at the ends of the chutes traveling on the ground. The chutes are raised and lowered simultaneously by attaching a link 45 to the connecting-bar 34, and the said link is carried upward and connected with a member of an angle-lever 46, the said angle-lever being provided with a thumb-latch for engagement with a rack 47, as shown in Figs. 1 and 2.

At the rearward ends of the guide-bars 27 of each chute a box B is located, the boxes being secured to the outer faces of the guide-bars, as shown in Figs. 3 and 5. Each box consists of a bottom bar 48, connected by an upright 49 with a shorter upper bar 50, the uprights 49 being secured to the said guide-bars 27. The bars 48 and 50 are at right angles to the guide-bars 27, as shown particularly in Fig. 3, and in the further construction of each box an upper and a lower arm 51 are provided, projected rearwardly from the outer end of the upper bars 50 of the boxes and a central portion of the lower bars 48, the arms 51 being substantially parallel with the guide-bars 27, and the upper and lower arms 51 terminate in transverse heads 52. Vertical braces 53 are supported at their lower ends upon the upper faces of the upper members of the boxes B, being secured to the said heads by bolts 54. (Shown in both Figs. 3 and 5.) The upper ends of the braces 53 are connected by bolts or equivalent fastening devices with a transverse bar 55, the bar being in engagement with the braces 53 of all of the gathering-chutes, strengthening the said chutes at their rear portions in like manner as the connecting-bar 34 strengthens the chutes at their forward portions.

In connection with each chute two vertical shafts 56 are employed. These shafts are journaled at their lower ends in the head portions 52 of the boxes B and at their upper ends are journaled in the connecting-bar 55 and in U-shaped supports 57, secured upon the said connecting-bar 55, one of said hangers being used in connection with each gathering-chute. A driving-shaft 59 is journaled in the upright members 58 of all of the supports 57, so that the said shaft 59 passes across the rear portion of all of the gathering-chutes. Each vertical shaft 56 is provided at its upper end with a beveled pinion 60, and these pinions mesh with beveled pinions 61, secured upon the shaft 59, while at the lower end of each vertical shaft 56, within the boxes B, a large sprocket-wheel 62 is secured.

The beans gathered by each chute are received between walls 63, and these walls are preferably made of galvanized iron or other sheet metal and are attached to the guide-bars 27, extending upwardly and in opposite directions therefrom and then vertically upward to a point near the upper connecting-bar 55, as shown in Fig. 5. These walls or sheets of metal extend from end to end of the guide-bars 27 of the chutes and may extend beyond the rear ends of the said guide-bars; but preferably at the rear ends of the guide-bars 27 of each shaft a vertical spring-plate 64 is secured in any suitable or approved manner, and these plates extend rearwardly between sprocket-wheels 62, as shown best in Fig. 3, and the spring-plates 64 have convexed inner faces, so as to confine the beans received between them to a greater or a less extent, and each of the spring plates or shields 64 is provided with a longitudinal opening 65, through which the teeth of gathering-chains C may be passed, the gathering-chains being carried by the sprocket-wheels 33 and 62. These gathering-chains are adapted to pull the plants from the ground and convey them to the space between the spring shields or plates 64, and as the teeth of the chain are drawn into the openings 65 in these plates or shields the plants are released from the teeth of the gathering-chains.

Two gathering-chains C are used in connection with each chute, and, as above stated, these chains pass around the sprocket-wheels 33 at the front portions of the chute and the larger sprocket-wheel 62 at the rear portions of the chutes, and the inner stretches of chain are supported upon the upper faces of the flanges 28 of the guide-bars 27. The teeth of the two chains carried by a chute are so placed that upon the inner stretches of the chain the teeth of one chain will be opposite the space between the teeth of the opposing chain. In other words, the teeth of the two chains of a chute upon their inner stretches are in alternate arrangement.

The gathering-chains C are of peculiar construction, being made up of a series of conical links 66, having base-flanges 67 extending from opposite sides, and the conical links are connected by open links 68, which pass through adjoining flanges of the conical links. The conical links are made hollow to a greater or less extent in order that they may receive the teeth from the sprocket-wheels over which they pass. The gathering-chains likewise pass in engagement with the tension-sprocket 41, and the said tension-sprockets may be adjusted to or from the belts to tighten or to loosen the said belts, as occasion may demand.

A sprocket-pinion 70 is secured upon the drive-shaft 59, at its left-hand end, and the said sprocket-pinion is connected by a belt 71 with a large sprocket-wheel 72, secured upon the axle 18. Each of the gathering-chutes is longitudinally strengthened through the medium of bars 73, which bars are attached to the upwardly-projecting portions 44 of the hanger-sleeves 43, as shown in Fig. 4, being likewise attached to the upright members 58 of the U-hangers 57, as illustrated in Figs. 1 and 5. Near the rear end of the frame of the machine a vertical bar 74 is secured to the end faces of the side sills 10, and the lower ends of these vertical bars are connected by a cross-bar 75, (shown in Figs. 1 and 3,) and when the chutes are in their upper position they will rest upon the lower cross-bar 75 of the frame. Just back of the lower cross-bar 75 a receptacle D is constructed, adapted to receive the beans from the chutes, the said receptacle being below the space between the spring plates or shields 64. The receptacle D is usually formed by attaching forwardly and downwardly curved bars 76 to the lower cross-bar 75 and covering these bars 76 with sheet metal 77, the bars 76 forming only a portion of the bottom of the receptacle. The ends of the receptacle are formed by attaching sheets 78, of metal, to the side sills 10 and to the bottom sheets 77.

Thus it will be observed that the back and the main portion of the bottom of the receptacle D are open; but these open portions of the receptacle are normally closed by an angular gate or door D', constructed of L-shaped bars 79, provided with a sheet-metal covering 80, and when the door D' is closed the forward edge of the door will engage with the rear ends of the bars 76. The bars 76 are curved so as to direct the material about centrally to the bottom of the receptacle D, and the lower member of the door D' is given a downward inclination, so that when the door is open the beans contained in the receptacle D will quickly drop therefrom. The door D' is pivoted upon a shaft 81, which is journaled at the rear of the upper rear sill 12 of the frame. The shaft 81 is provided with an upwardly-extending arm 82, and this arm is connected by a link 83 with a lever 84, fulcrumed usually upon the forward cross-bar 16, and by carrying the lever 84 forwardly the door D' will be opened. The weight of the door, however, is usually sufficient to maintain it in a closed position. If not, a suitable thumb-latch and rack may be provided for the lever 84.

As a guide for the outer stretches of the gathering-chains C, I employ supporting-bars 69, one end of each of said bars being pivoted upon a tension-post 36, as shown best in Fig. 4, while the rear ends of the supporting-bars 69 are attached to the boxes B, as shown in Fig. 5. It may here be observed that the plates 64, through which the gathering-chains pass, may be termed "stripping-plates," as their functions are not only to direct the plants to the receptacle D, but also to strip the plants from off the projections of the chains.

Having thus described my invention, I claim as new and desire to secure by Letters Patent—

1. A harvester, having a gathering-chute, comprising the combination of two parallel guide-bars, a transverse connecting-bar, uprights fastened to the connecting-bar and the guide-bars to hold the latter rigidly, hangers attached to the guide-bars to support the same, vertical braces in connection with the guide-bars, a transverse bar held rigidly by the braces, a U-shaped support mounted on the said transverse bar, a drive-shaft adapted to turn in the support, two gear-wheels fixed to the drive-shaft, vertical shafts mounted in the support, pinions attached to the vertical shafts and meshing with gears on the drive-shaft, boxes attached to the guide-bars and carrying the lower ends of the vertical shafts, sprocket-wheels attached to the lower ends of the vertical shafts, a sprocket-wheel carried at the forward portion of each guide-bar, and endless gathering-chains running over each pair of sprocket-wheels and longitudinally with the guide-bars.

2. In a harvester, a gathering-chute comprising the combination of two rigidly-connected guide-bars, a bearing at the rear end of each guide-bar, vertical braces standing respectively on the bearings, a transverse bar joined to the upper ends of the braces, a U-shaped support carried on the transverse bar, a drive-shaft mounted in the support, gear-wheels attached to the drive-shaft, vertical shafts mounted in the support and in the bearings, pinions attached to the vertical shafts and meshing with the gears of the drive-shaft, sprocket-wheels respectively carried on the vertical portions of the shafts, and endless guide-chains running around and driven by the respective sprocket-wheels.

3. In a harvester, the combination with the frame and a wheeled axle therefor, of a swinging hanger supported from the axle, a gathering-chute held by the hanger, a gathering-chain running on the chute, gearing extending between the chute and the axle to drive the gathering-chain, a longitudinally-extending strengthening-bar fixed to the rear portion of the gathering-chute, and an upwardly-extending projection formed on the hanger and connected with the forward end of the strengthening-bar.

THOMAS T. BROWN.

Witnesses:
A. H. PITKIN,
ROBERT TEAL.